United States Patent Office
3,079,387
Patented Feb. 26, 1963

3,079,387
4-(12-ACETOXYRICINOLEOYL) DERIVATIVES OF MORPHOLINE AND METHOD OF PREPARATION
Harold P. Dupuy, Leo A. Goldblatt, and Frank C. Magne, all of New Orleans, La., assignors to the United States of America as represented by the Secretary of Agriculture
No Drawing. Application Nov. 18, 1959, Ser. No. 859,-831, now Patent No. 3,052,680, dated Sept. 4, 1962, which is a division of application Ser. No. 786,661, Jan. 13, 1959. Divided and this application Feb. 2, 1962, Ser. No. 179,829
3 Claims. (Cl. 260—247.2)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the government of the United States of America.

This application is a division of Serial No. 859,831, filed November 18, 1959, now Patent Number 3,052,680, which in turn was a division of Serial No. 786,661, filed January 13, 1959, now Patent No. 2,971,855.

This invention relates to nitrogen-containing derivatives of ricinoleic acid. More particularly, this invention relates to the morpholides and cyanoethylated derivatives of ricinoleic acid and its derivatives. These nitrogen-containing compounds have utility as plasticizers for both vinyl chloride polymers and for cellulose esters.

Ricinoleic acid is a unique fatty acid found in castor oil in the form of an ester of glycerol. Ricinoleic acid normally comprises about 90% of the fatty acids present, as glycerides, in castor oil. Chemically, ricinoleic acid is 12-hydroxyoleic acid or 12-hydroxy-9-octadecenoic acid which may be represented by the following formula:

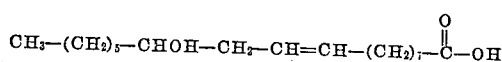

A morpholide of an acid is an amide of the acid in which the amido nitrogen atom is a nitrogen atom of a morpholine ring. Prior workers have produced the morpholides and other amides of some of the more common fatty acids. The morpholides have generally been prepared by the reaction of morpholine with acid chlorides, acids, or acid anhydrides.

Cyanoethylated derivatives are conventionally produced by vinyl addition of acrylonitrile ($CH_2{=}CHCN$) to reactive hydrogen atoms contained in alcohols, phenols, and the like compounds. Each reactive hydrogen atom causes a vinyl group of the acrylonitrile to become saturated, thus producing cyanoethylated derivatives having beta-substituted propionitrile groups attached via ether linkages. The cyanoethylation reaction has been applied in the prior art to a large number of monohydric and polyhydric alcohols, as well as to numerous other compounds having reactive hydrogen atoms.

A primary object of the present invention is to provide processes for producing new morpholides and cyanoethylated derivatives of ricinoleic acid and its derivatives. A further object is to produce novel nitrogen-containing plasticizers from ricinoleic acid and its derivatives, said plasticizers being suitable for plasticizing either vinyl chloride polymers or cellulose esters. Other objects will be apparent from the description of the invention.

In general, according to this invention, the esters of ricinoleic acid and of its derivatives are reacted with morpholine to produce the morpholides. It is generally preferred to use the methyl esters for this "ammonolysis" reaction, although other esters such as ethyl esters, propyl esters etc. may also be employed. When the preferred methyl esters are subjected to the ammonolysis reaction with morpholine, the hydrogen atom of the secondary amine structure of the morpholine combines with the methoxyl group of the ester to yield methyl alcohol and the morpholide, according to the following equation:

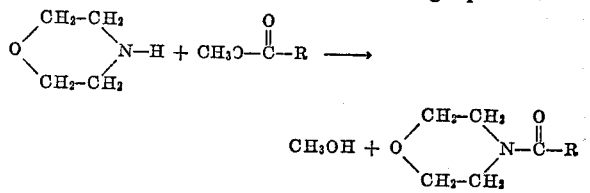

where R represents an alkyl or alkenyl group having an alcoholic hydroxyl substituent. The hydroxyl group can either be left free and unreacted, or it can be made to react with any of the reactants commonly used for reacting with alcoholic hydroxyl groups.

Suitable methyl ester reactants include: methyl ricinoleate; methyl 12-hydroxystearate; methyl ricinelaidate; and the like. Suitable reactants for introducing substituents on the hydroxyl groups of the morpholides include acetic anhydride for making acetoxy derivatives, acrylonitrile for making cyanoethylated derivatives, and the like reagents commonly used for reacting with alcoholic hydroxyl groups.

The reaction for preparation of morpholides according to this invention proceeds smoothly at relatively moderate temperatures in the absence of a catalyst. The morpholides can be obtained in substantially quantitative yield simply by refluxing the methyl esters with morpholine, while at the same time distilling off the methyl alcohol as it is formed in the reaction. This is the preferred procedure. Since the distillation temperature of methyl alcohol is quite low as compared to that of morpholine, efficient fractionation is not required and relatively little of the morpholine distills over with the methanol during the course of the reaction. The progress of the reaction can be followed conveniently by observing the rise in reflux temperature or more accurately by titrating aliquots of the reaction mixture to ascertain the quantity of unreacted morpholine remaining.

It is generally preferred to carry out the reaction at a temperature at least as high as the reflux temperature of the particular mixture of reactants being employed. Temperatures considerably lower than this are not generally suitable, since the rate of reaction becomes too slow to be practical. Extremely high temperatures are not desirable, especially when unsaturated methyl ester reactants are used, since there is danger of degradation, modification, or decomposition of the reactants.

While the morpholine and the ester reactants combine in a 1:1 ratio, it is usually preferred to employ an excess of morpholine. About 2 moles of morpholine for each mole of ester is particularly suitable.

The length of reaction time can be controlled depending on the particular reactants being employed and the extent of conversion desired by the operator. Essentially complete conversion to the morpholide is usually achieved in about 36 hours under the preferred conditions.

Although suitable unreactive solvents for the reactants can be used in the reaction mixture, it is not generally desirable or advantageous to employ such solvents. The morpholine and ester reactants are mutually soluble and provide a homogeneous reaction mixture without the incorporation of a solvent.

The isolation and recovery of the morpholide product can be accomplished without difficulty. At the end of the reaction period, the excess morpholine is removed, preferably by distillation at a pressure below normal atmospheric pressure. The morpholide product remaining can be used without further purification, or it can be purified by conventional means. Distillation, solvent crystallization, and the like are generally preferred means for purifying the morpholides.

The unreacted hydroxyl group of the morpholide products of the present invention can be acylated with the usual acylating agents under the conditions conventionally employed for acylations. For example, unique acetoxy derivatives can be prepared by treating said morpholides with acetic anhydride. It is generally preferred to use an excess of acetic anhydride and heat the reaction mixture to a temperature below the decomposition temperature of the reactants during the acylation. It is convenient to employ about 1 part by weight of the acetic anhydride for each part by weight of morpholide, and to carry out the acylation reaction at the reflux temperature of the reaction mixture until the desired extent of reaction is obtained. The acetoxy derivative is readily isolated by means of distillation or other conventional procedures.

In preparing cyanoethylated derivatives of ricinoleic acid derivatives according to the process of the present invention, acrylonitrile is reacted with the reactive hydrogen atoms of the alcoholic hydroxyl groups of the ricinoleic acid derivatives. The cyanoethylated products contain beta-substituted propionitrile groups attached by means of ether linkages. For example, when 4-ricinoleoylmorpholine is the reactant being cyanoethylated the reaction can be represented by the following equation:

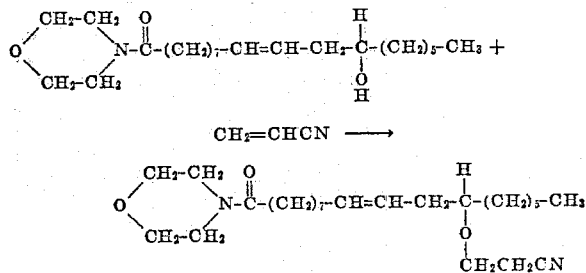

Suitable reactants which can be cyanoethylated include: 4-ricinoleoylmorpholine; 4-(12-hydroxystearoyl)morpholine; ricinoleyl alcohol; and the like. When ricinoleyl alcohol is used as the reactant, both of the alcoholic hydroxyl groups of said reactant are cyanoethylated to yield the di-cyanoethoxy compound, namely 1,12-di-beta-cyanoethoxy-9-octadocene.

The cyanoethylation reaction proceeds readily at moderate temperatures in the presence of an alkaline catalyst. Any of the conventional alkaline catalysts, such as metallic sodium or potassium (producing the corresponding alkoxides) may be used. We prefer to employ a quaternary amine base type catalyst, such as benzyltrimethylammonium hydroxide and the like. The concentration of catalyst in the reaction mixture can be varied widely. About 0.04 part by weight of quaternary amine for 1 part by weight of reactant being cyanoethylated is particularly suitable.

It is generally preferred to conduct the reaction in a suitable solvent medium. Any solvent in which the reactants are soluble and which is unreactive toward the reactants is generally suitable. Dioxane is a particularly suitable solvent. The quantity of solvent employed can be varied widely, but about 1 part by weight of solvent for each part by weight of reactant being cyanoethylated is usually preferred.

The relative amounts of ricinoleic acid derivative and acrylonitrile in the reaction mixture can be varied widely. However, since these two reactants combine in a 1:1 ratio for each hydroxyl group undergoing cyanoethylation, it is desirable to assure at least this theoretical ratio in the reaction mixture. An excess of acrylonitrile is usually preferred. About 2 moles of acrylonitrile for each mole of hydroxyl group in the reactant being cyanoethylated is particularly suitable.

The use of a polymerization inhibitor in the reaction mixture is desirable. Otherwise, an excessive amount of the acrylonitrile will polymerize to form polyacrylonitrile and thus be unavailable for the cyanoethylation reaction. Water is preferred, in view of the fact that it is an economical and effective polymerization inhibitor. When using water, we prefer to use about 0.1 part by weight of inhibitor for each part by weight of reactant being cyanoethylated.

While temperatures ranging from about room temperature to the decomposition temperature of the reactants can be used, maximum temperatures of from about 70° C. to about 85° C. are particularly suitable for employment in the cyanoethylation process of the present invention. A preferred procedure is to add the acrylonitrile to the reaction mixture at such a rate that as the reaction proceeds the temperature of the mixture gradually rises to the preferred maximum reaction temperature (about 70° C. to 85° C.). Following complete addition of the acrylonitrile, the reaction mixture is maintained at the said preferred maximum reaction temperature a sufficient length of time until the desired extent of cyanoethylation is achieved. From about 50% to about 80% conversion to cyanoethylated product is achieved in about 3 to 4 hours under the preferred reaction conditions. The cyanoethylated product can be isolated and recovered without difficulty by employing conventional procedures such as phasic separations, distillations, crystallization from solvents and the like.

The nitrogen-containing derivatives of the present invention have unique plasticizing properties. They exhibit good compatibility with polymers and copolymers of monomers predominating in vinyl chloride, such as polyvinyl chloride, and the vinyl chloride-vinyl acetate copolymers predominating in vinyl chloride. They can be employed as plasticizers in proportions of from about 10 to 80 parts by weight per 100 parts by weight of polymer. In addition, some of the nitrogen-containing derivatives are likewise suitable as plasticizers for cellulose esters, such as cellulose acetate. They can usually be employed in proportions of up to about 40 parts by weight per 100 parts by weight of cellulose acetate and still exhibit good compatibility. The suitability of the nitrogen containing derivatives of this invention as plasticizers for two such widely different types of materials is unique.

The following examples are given by way of illustration and not by way of limitation of the invention.

EXAMPLE 1

A mixture of 312 grams (1 mole) of methyl ricinoleate and 174 grams (2 moles) of morpholine was heated in a reaction flask under gentle reflux for about 36 hours. The methyl alcohol produced during the course of the reaction was allowed to distill out of the reaction flask through a short Vigreux column and condensed in a Dean-Stark trap. During the 36 hour reaction period, the reaction temperature gradually rose from 145° to 180° C. and approximately 1 mole of methyl alcohol was evolved. At the end of the reaction period, the unreacted morpholine was removed by distillation under vacuum. The reaction product was distilled, yielding 320 grams of material distilling at 243°–246° C. at 0.2 millimeters; $N_D^{25}$ 1.4891; $d_{25}^{25}$ 0.9756; $[\alpha]_D^{25}$ 4.36. The purified product contained 71.47% carbon, 11.02% hydrogen, 3.80% nitrogen, and 4.68% hydroxyl, as determined by conventional analytical procedures. The product was thus shown to be 4-ricinoleoylmorpholine which has a theoretical content of 71.88% carbon, 11.24% hydrogen, 3.81% nitrogen and 4.63% hydroxyl.

The 4-ricinoleoylmorpholine was compared with di(2-ethylhexyl)phthalate, "DOP," as the plasticizer in a standard formulation comprising: 63.5% of a vinyl chloride-vinyl acetate (95–5) copolymer, 35% plasticizer, 0.5% stearic acid, and 1.0% basic lead carbonate. The results are given in Table I.

Table I

| | Compatibility | Tensile strength p.s.i. | 100% modulus, p.s.i. | Elongation, percent | Brittle point, °C. |
|---|---|---|---|---|---|
| 4-ricinoleoylmorpholine. | Good | 3,030 | 1,840 | 330 | −35 |
| DOP | do | 3,000 | 1,650 | 320 | −31 |

The compatibility of the plasticizers with the vinyl chloride polymers in all of the examples was determined on the basis that exudation or "bleeding out" of the plasticizer within 15 days was "poor," and a lack of bleeding for at least 45 days was "good."

The 4-ricinoleoylmorpholine was also tested as a plasticizer for cellulose acetate. Thirty parts by weight of plasticizer and 100 parts by weight of cellulose acetate (40% acetyl content) were dissolved in acetone, and cast films were prepared from the acetone solution by allowing the solvent to evaporate slowly from portions of the solution placed in shallow dishes. The films were stripped from the dishes, heated 1 hour at 80° C., and examined. The films were dry and clear, indicating compatibility of the plasticizer with the cellulose acetate.

EXAMPLE 2

One part by weight of the 4-ricinoleoylmorpholine of Example 1 was refluxed with 1 part by weight of acetic anhydride for about 2 hours. The acetic acid and excess acetic anhydride were then removed from the reaction mixture by distillation under vacuum. The acetoxy derivative was purified by distillation at 0.2 millimeter pressure, its distillation temperature being 230°–234° C. at this pressure. The purified product had the following characteristics: $N_D^{25}$ 1.4789; $d_{25}^{25}$ 0.9836; $[\alpha]_D^{25}$ 20.35. It was found to contain 69.99% carbon, 10.53% hydrogen, 3.24% nitrogen and 0% hydroxyl. The product was thus shown to be 4-(12-acetoxyoleoyl)morpholine which has a theoretical content of 70.37% carbon, 10.58% hydrogen, 3.42% nitrogen, and 0% hydroxyl.

The 4-(12-acetoxyoleoyl)morpholine was compared with DOP in the standard formulation described in Example 1. The results are given in Table II.

Table II

| | Compatibility | Tensile strength p.s.i. | 100% modulus, p.s.i. | Elongation, percent | Brittle point, °C. |
|---|---|---|---|---|---|
| 4-(12-acetoxyoleoyl)morpholine. | Good | 2,990 | 1,370 | 340 | −23 |
| DOP | do | 3,000 | 1,650 | 320 | −31 |

The 4-(12-acetoxyoleoyl)morpholine was tested as a plasticizer for cellulose acetate (40% acetyl) as described in Example 1. Good compatibility was obtained using either thirty or forty parts by weight of plasticizer per 100 parts by weight of cellulose acetate.

EXAMPLE 3

A mixture of 314 grams (1 mole) of methyl 12-hydroxysterate and 174 grams (2 moles) of morpholine was reacted in the same manner and under the same conditions as described in Example 1. After removal of unreacted morpholine by vacuum distillation, the reaction product was distilled, yielding 330 grams of material distilling at 245°–249° C. at 0.25 millimeter. The purified product obtained by crystallization of this distillate from commercial hexane contained 71.53% carbon, 11.79% hydrogen, 3.75% nitrogen, and 4.59% hydroxyl. The product was thus shown to be 4-(12-hydroxystearoyl)morpholine which has a theoretical content of 71.49% carbon, 11.73% hydrogen, 3.79% nitrogen, and 4.60% hydroxyl.

EXAMPLE 4

One part by weight of the 4-(12-hydroxystearoyl)morpholine of Example 3 was refluxed with 1 part by weight of acetic anhydride for about 2 hours. The acetic acid and excess acetic anhydride were then removed by vacuum distillation. The reaction product was purified by distillation at 0.2 millimeter pressure, its distillation temperature being 234°–235° C. at this pressure. The purified product had the following characteristics: $N_D^{25}$ 1.4709; $d_{25}^{25}$ 0.9726. It was found to contain 69.62% carbon, 11.17% hydrogen, 3.24% nitrogen, and 0% hydroxyl. The product was thus shown to be 4-(12-acetoxystearoyl)morpholine which has a theoretical content of 70.03% carbon, 11.02% hydrogen, 3.40% nitrogen, and 0% hydroxyl.

The 4-(12-acetoxystearoyl)morpholine was compared with DOP in the standard formulation described in Example 1. The results are given in Table III.

Table III

| | Compatibility | Tensile strength p.s.i. | 100% modulus, p.s.i. | Elongation, percent | Brittle point, °C. |
|---|---|---|---|---|---|
| 4-(12-acetoxystearoyl)morpholine. | Good | 2,980 | 1,510 | 300 | −21 |
| DOP | do | 3,000 | 1,650 | 320 | −31 |

EXAMPLE 5

A mixture of 312 grams (1 mole) of methyl ricinelaidate and 174 grams (2 moles) of morpholine was reacted in the same manner and under the same conditions as described in Example 1. After removal of unreacted morpholine by vacuum distillation, the reaction product was distilled at 209° C. at 0.1 millimeter pressure. The distilled product melted at 26.2°–26.8° C. and contained 71.23% carbon, 11.27% hydrogen, and 3.90% nitrogen. It was thus shown to be 4-ricinelaidoylmorpholine which has a theoretical content of 71.88% carbon, 11.24% hydrogen, and 3.81% nitrogen.

EXAMPLE 6

368 grams (1 mole) of the 4-ricinoleoylmorpholine of Example 1 was dissolved in 368 grams of dioxane. To this solution was added 37 milliliters of water as a polymerization inhibitor and 37 milliliters of Triton B (a 40% by weight solution of benzyltrimethylammonium hydroxide in methyl alcohol) as catalyst. To moles (106 grams) of acrylonitrile was then added dropwise to the mixture with stirring during a 30-minute period, during which time the temperature rose to about 85° C. The reaction mixture was stirred and maintained at about 75° C. for three additional hours, and was poured while still warm into 3 liters of diethyl ether. The solution was allowed to stand a few hours to precipitate most of the polyacrylonitrile. The ethereal solution was decanted from the precipitate, filtered, and the filtrate was neutralized with dilute aqueous hydrochloric acid and then washed free of excess acid with water. The resulting ethereal layer was vacuum distilled to remove ether, and then distilled rapidly under high vacuum to isolate the cyanoethylated product. The fraction which distilled at 248°–254° C. at 20 microns pressure was purified by crystallization from 15 volumes of methyl alcohol at −70° C. overnight. The purified product had the following characteristics: $N_D^{30}$ 1.4816;

$$\alpha_{10 \text{ cm.}}^{25} \ 14.20$$

It was found to contain 70.74% carbon, 10.40% hydrogen, and 6.64% nitrogen. The product was thus shown to be 4-(12-beta-cyanoethoxyoleoyl)morpholine which has a theoretical content of 71.38% carbon, 10.54% hydrogen, and 6.66% nitrogen.

The 4-(12-beta-cyanoethoxyoleoyl)morpholine was compared with DOP in the standard formulation described in Example 1. The results are given in Table IV.

Table IV

|  | Compatibility | Tensile strength, p.s.i. | 100% modulus, p.s.i. | Elongation, percent | Brittle point, °C. |
|---|---|---|---|---|---|
| 4-(12-beta-cyanoethoxyoleoyl)-morpholine. | Good | 3,000 | 1,550 | 340 | −25 |
| DOP | do | 3,000 | 1,560 | 350 | −33 |

EXAMPLE 7

370 grams (1 mole) of the 4-(12-hydroxystearoyl)-morpholine of Example 3 was cyanoethylated with 106 grams (2 moles) of acryonitrile in the same manner and under the same conditions as described in Example 6. In this case, the acrylonitrile was added during a 20-minute period and the temperature of the reaction mixture rose to about 80° C. The mixture was then stirred and maintained at 70° C. for three additional hours. The reaction mixture was further processed as described in Example 6. The fraction of the reaction product which distilled at 246°–252° C. at 25 microns pressure was purified by crystallization from 10 volumes of acetone at −25° C. overnight to precipitate non-cyanoethylated morpholide. Acetone was removed from the resulting filtrate by vacuum distillation to obtain the cyanoethylated morpholide. It was recrystallized from 15 volumes of methyl alcohol at −70° C. overnight. The recrystallized product contained 70.85% carbon, 10.85% hydrogen, and 6.55% nitrogen. The product was thus shown to be 4-(12-beta-cyanoethoxystearoyl)-morpholine which has a theoretical content of 71.04% carbon, 10.97% hydrogen, and 6.63% nitrogen.

The 4-(12-beta-cyanoethoxystearoyl)morpholine was compared with DOP in the standard formulation described in Example 1. The compatibility of the 4-(12-beta-cyanoethoxystearoyl)morpholine was good. Its percent elongation was 380% as compared to 320% for DOP, and its tensile strength was 3120 p.s.i. as compared to 3000 p.s.i. for DOP.

EXAMPLE 8

1284 grams (1 mole) of ricinoleyl alcohol was dissolved in 284 grams of dioxane. To this solution was added 28 milliliters of water as a polymerization inhibitor and 28 milliliters of Triton B (a 40% by weight solution of benzyltrimethylammonium hydroxide in methyl alcohol) as catalyst. Four moles (212 grams) of acrylonitrile was then added dropwise to the mixture with stirring during a 1-hour period, during which time the temperature rose to about 70° C. The reaction mixture was stirred and maintained at about 70° C. for three additional hours, and was poured while still warm into 3 liters of diethyl ether. The solution was allowed to stand a few hours to precipitate most of the polyacrylonitrile. The ethereal solution was decanted from the precipitate and the ether was removed from the solution by vacuum distillation. The residue was distilled rapidly under high vacuum. The fraction which distilled at 228°–238° C. at 25 microns pressure was crystallized from 15 volumes of methanol at −70° C. overnight. The purified product had the following characteristics: $N_D^{30}$ 1.4632;

$$\alpha_{10\,cm}^{25}\ 14.30$$

It was found to contain 74.20% carbon, 11.18% hydrogen, and 7.08% nitrogen. The product was thus shown to be 1,12-di-beta-cyanoethoxy-9-octadecene which has a theoretical content of 73.79% carbon, 10.84% hydrogen, and 7.17% nitrogen.

The 1,12-di-beta-cyanoethoxy-9-octadecene was compared with DOP in the standard formulation described in Example 1. The results are given in Table V.

Table V

|  | Compatibility | Tensile strength, p.s.i. | 100% modulus, p.s.i. | Elongation, percent | Brittle point, °C. |
|---|---|---|---|---|---|
| 1,12-di-beta-cyanoethoxy-9-octadecene. | Good | 2,840 | 1,210 | 350 | −55 |
| DOP | do | 3,030 | 1,520 | 370 | −37 |

We claim:
1. A process comprising esterifying a morpholide selected from the group consisting of 4-ricinoleoylmorpholine and 4-(12-hydroxystearoyl)morpholine with acetic anhydride.
2. 4-(12-acetoxyoleoyl)morpholine.
3. 4-(12-acetoxystearoyl)morpholine.

References Cited in the file of this patent

UNITED STATES PATENTS 2,954,383  Schlesinger et al. _____ Sept. 27, 1960

OTHER REFERENCES

Dupuy et al.: J. Amer. Oil Chemists' Society, vol. 35, pages 99–102 (1958).